March 3, 1931. W. A. DOREY 1,794,839

LUMINAIR

Filed Dec. 6, 1929 5 Sheets-Sheet 1

INVENTOR.
William A. Dorey
BY Jacob Lieberman
ATTORNEY.

March 3, 1931. W. A. DOREY 1,794,839
LUMINAIR
Filed Dec. 6, 1929 5 Sheets-Sheet 2

INVENTOR.
William A. Dorey
ATTORNEY

March 3, 1931. W. A. DOREY 1,794,839
LUMINAIR
Filed Dec. 6, 1929   5 Sheets-Sheet 3

INVENTOR.
William A. Dorey
BY
ATTORNEY.

March 3, 1931.  W. A. DOREY  1,794,839
LUMINAIR
Filed Dec. 6, 1929  5 Sheets-Sheet 4

INVENTOR.
William A. Dorey
BY
ATTORNEY.

March 3, 1931.  W. A. DOREY  1,794,839
LUMINAIR
Filed Dec. 6, 1929  5 Sheets-Sheet 5

INVENTOR.
William A. Dorey.
BY
ATTORNEY.

Patented Mar. 3, 1931

1,794,839

UNITED STATES PATENT OFFICE

WILLIAM A. DOREY, OF NEWARK, OHIO, ASSIGNOR TO HOLOPHANE COMPANY, INC., OF NEW YORK, N. Y., A CORPORATION OF DELAWARE

LUMINAIR

Application filed December 6, 1929. Serial No. 412,020.

The present invention relates to luminairs and is more particularly directed toward inclosed luminairs suitable for show window lighting.

The present invention contemplates a two part inclosed luminair for this purpose wherein the light source, preferably mounted on a vertical axis, is surrounded by a reflector form having an inclined axis preferably provided with inclined glass prisms and adapted to redirect light toward the opening in a predetermined manner. The opening in the reflector form is closed or covered by a lens plate especially designed to utilize the direct light and the reflected light which it receives from the reflector form. The reflector form and cover are preferably designed to deliver a major portion of the light rays in a beam which is narrow in directions transverse to the inclination of the reflector form, most concentrated along the axis of the reflector form but extended up to the horizontal in the general direction of the inclination of the axis and restricted at high angles on the opposite side of the axis.

The employment of two glass parts completely enclosing the light source makes it possible to control all the light, so that it may be emitted with the desired light pattern, and characterized by a lack of glare and striations. The enclosed unit may be mounted in an appropriate recess in the ceiling of the show window so as to improve the appearance of the show window and reduce to a minimum the deleterious effects of dust.

A further object of the invention is to design the glass parts so that the lens may occupy a substantially horizontal position, whereby the unit may be mounted flush with the show window ceiling, thereby materially simplifying the show window construction and the installation of the unit.

Other and further objects will appear or be pointed out as the description proceeds.

The accompanying drawings show, for purposes of illustration, several of the many possible embodiments in which the present invention may take form, it being understood that the drawings are illustrative of the invention rather than limiting the same.

In these drawings.

Figures 1, 1A, 1B, 2, 3A:
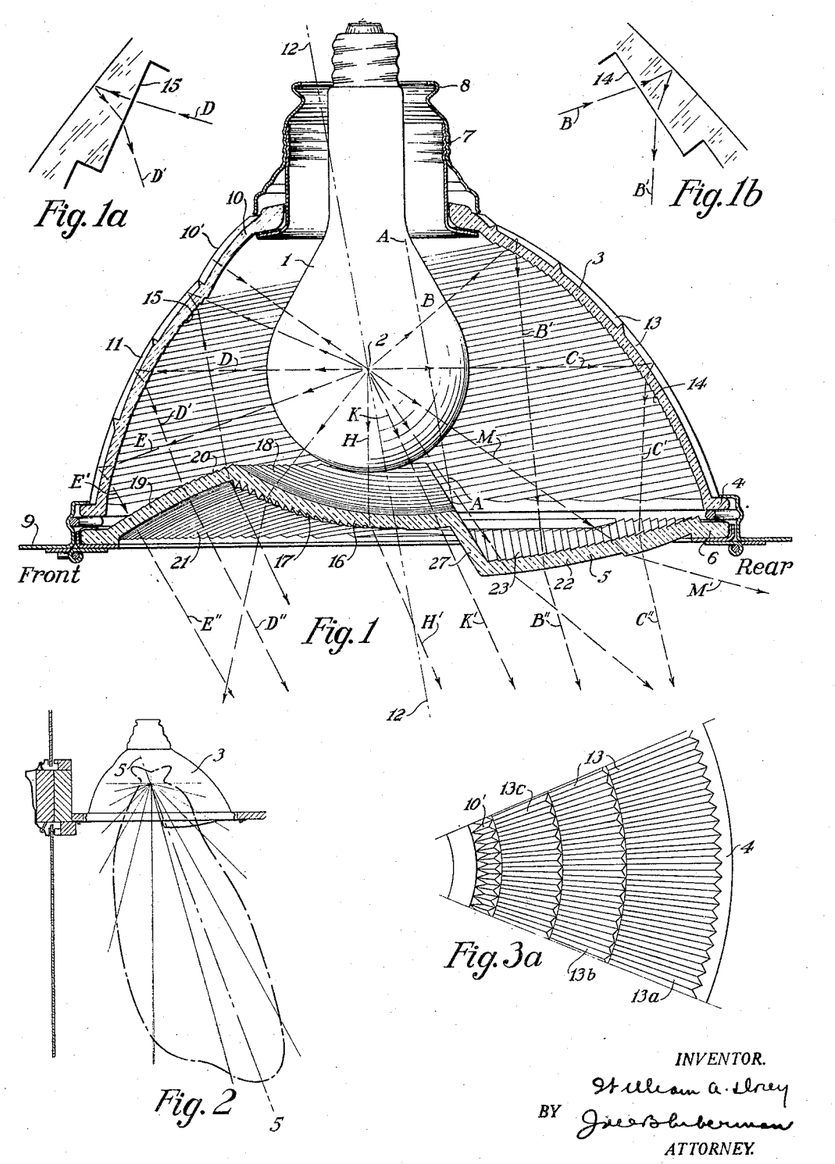
Figure 1 is a vertical cross section through one form of luminair in a plane at right angles to the front of the window and also on the line 1—1 of Figure 6 looking in the direction of the arrows.
Figures 1a and 1b are enlarged views showing typical prisms on the interior surface of the reflector.
Figure 2 shows the distribution of light in the plane of Figure 1.
Figure 3a is a fragmentary top plan view of the outside prisms on the reflector form of Figure 1.
Figure 3B:
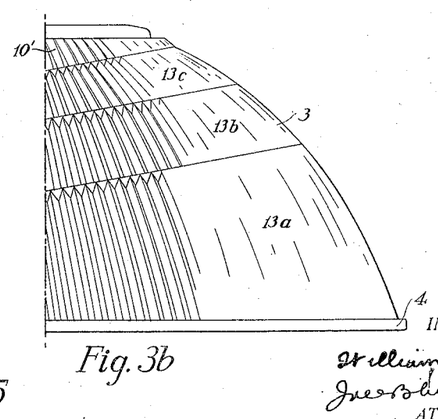
Figure 3b is a side elevational view of the reflector form taken in the same direction as Figure 1.
Figure 4:
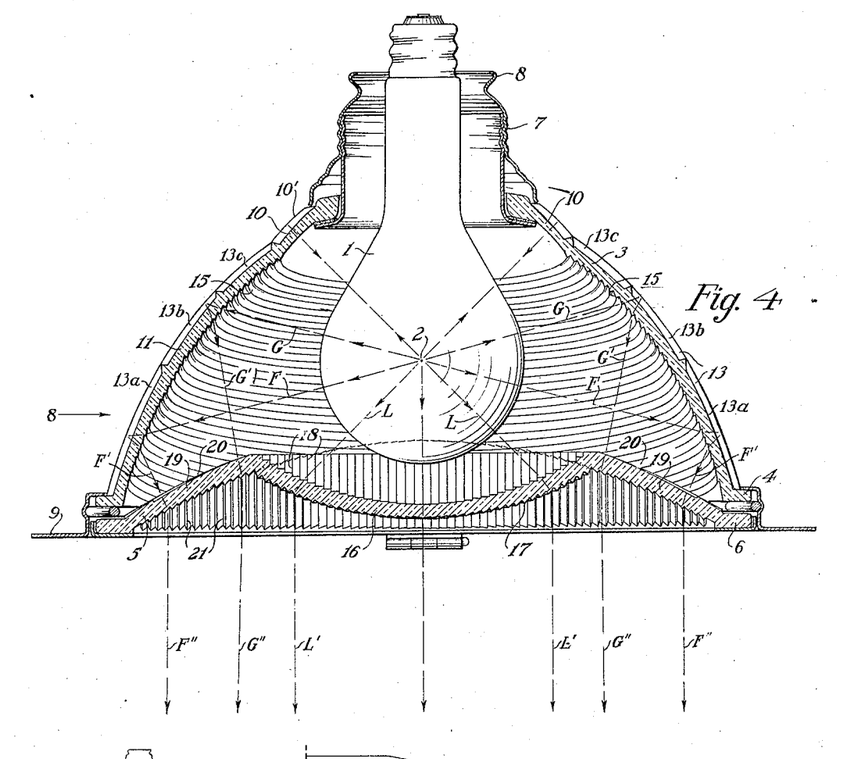
Figure 4 is a vertical cross sectional view taken at right angles to Figure 1, this section being parallel to the front of the window and on the line 2—2 of Figure 6.

Referring to Figure 1 and Figure 4, 1 is an incandescent lamp having its light source at 2. The upper part of the lamp is covered by a glass reflector form 3 having a horizontal circular flange 4 whose center is displaced to the rear of the lamp axis. The opening in the reflector form is covered by the lens plate 5 having a horizontal flange 6 by which it is secured opposite the reflector flange 4. The top of the reflector form 3 is fitted with a metal extension holder 7. The luminair may be supported by means of the lip 8 on holder extension 7, or, if the unit be recessed, may be supported by the metal flange 9.

As here shown, the reflector form 3 is a one piece glass unit having an upper spherical part 10 and a lower part 11 formed about a slanting axis 12—12. The upper part 10 consists essentially of a spherical reflector, and, while it may be made of metal, it is preferably made of glass and provided with external reflecting prisms 10' adapted to totally reflect the light and return it toward the light center 2. The slanting axis 12—12 of the lower part of the reflector passes through the light center and slants toward the rear of the window.

The outer surface of the reflector form is provided with radial reflecting prisms 13, preferably arranged in tiers or steps 13$a$, 13$b$, and 13$c$, so that the reflected light will not be scattered over the surface of the lamp. The inner surface of the reflector form is provided with refracting ribs 14 and 15 dispensed in planes at right angles to the slanting reflector axis and extending to a divison line indicated in Figure 1 at A—A. They are designed to vary the distribution of the light from the reflector as may be required by the design of the lens cover.

The external prisms 13 and the internal ribs 14 at the rear of the reflector form act, as indicated in Figure 1, by the rays B, B' and C, C' to redirect the light into downward directions slightly convergent and nearly vertical. The internal ribs 15 at the front of the reflector form produce a downwardly and rearwardly converging beam of arcuate shape, as indicated in Figures 1 and 4, by the rays D, D', E, E', F, F', and G, G'.

Referring to Figures 1, 4, 6 and 8, it will be seen that the lens cover, like the reflector form, is symmetrical about a vertical plane passing through the slanting axis of the reflector form. It is divided into three main portions, the functions of which are somewhat different. It is desirable that no direct light should be thrown at very high angles toward the front of the window. Light thrown at any angle less than about 15° with the vertical towards the window pane will be, to a great degree, reflected back into the window, but light at any higher angles may be wasted, and, unless it is diffused, is apt to cause discomfort to observers.

Figures 6, 7, 8:
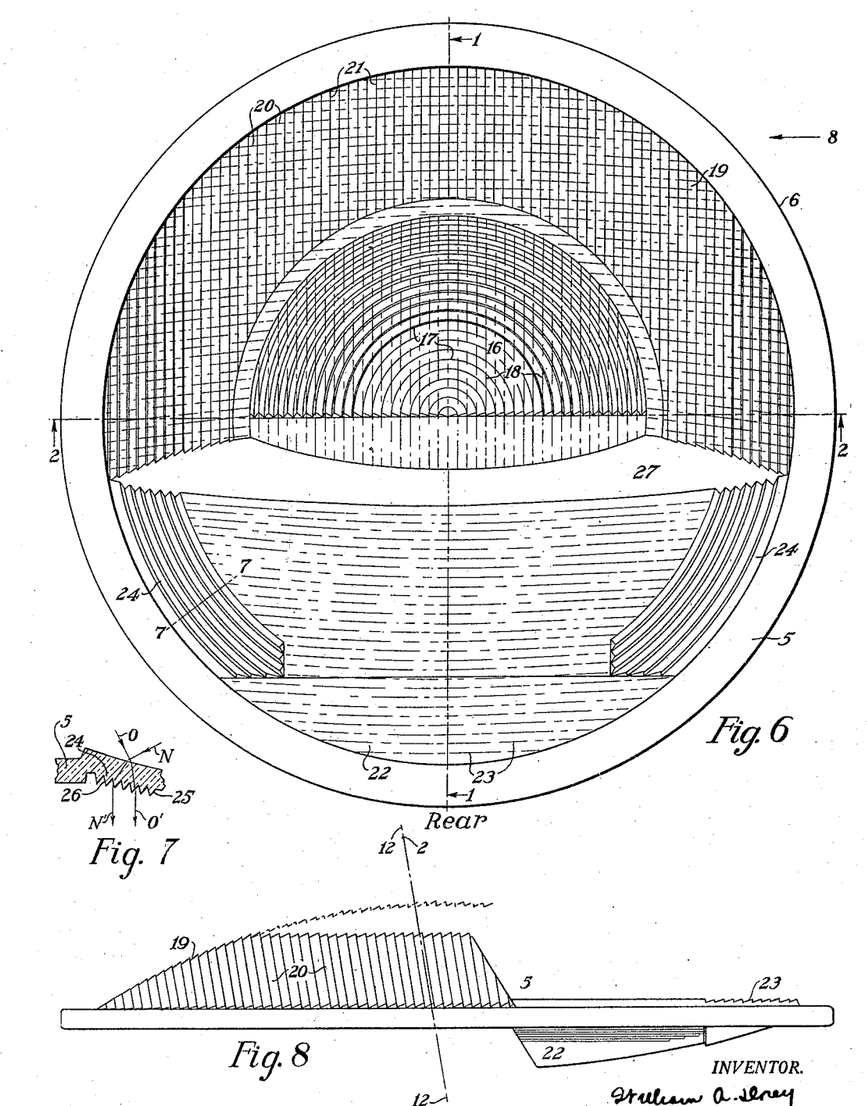
Figure 6 is an inverted plan view of the lens plate covering the bottom of the luminair.
Figure 7 is a sectional view on the line 7—7 of Figure 6 showing the lateral light collecting prisms.
Figure 8 is a side elevational view of the lower lens plate taken in the direction of the arrow 8 of Figures 4 and 6.

The central portion 16 of lens 5 is provided on its outside surface with concentric prisms 17 adapted to concentrate direct light received from the source to a moderate degree toward the interior of the window. The inside of this section is provided with parallel prisms 18, adapted to narrow this beam in lateral directions. This central section of the lens receives light direct from the source and light coming from the spherical portion 10 of the reflector. It does not receive light from the lower part 11 of the reflector.

Surrounding lens section 16 toward the front of the window is an arcuate lens section 19. This section is arched above the meeting plane of the reflector and cover so as to receive very little direct light from the source, but it does receive the converging light beam produced by the ribs 15 inside the reflector form. It is so constructed that such direct light as it receives is reflected in the interior of the glass so that it is scattered and reduced in intensity and will not cause glare outside of the window. The upper or inner surface of section 19 is provided with transverse prisms 20 designed to refract the reflected light received inwardly. These prisms are parallel to the inclined reflector axis 12—12, and, therefore, appear curved in Figure 6. These prisms act on the rays D', E', etc. to further converge and to rearwardly direct the light as indicated by the rays D'' and E''.

The lower or outside surface of section 19 is provided with longitudinal parallel prisms 21 adapted to straighten the converging light to substantial parallelism, condensing it toward the plane of symmetry and restricting the spread of the beam laterally. The complete prism section is indicated in dotted lines in Figure 4. These prisms act to convert the converging light into a parallel beam, as indicated at F'' and G''. In effect, the ribbings 20 and 21 form a concave lens surface receiving a converging beam and changing it to a parallel beam, while the interior ribbings 18 on the interior surface of section 16 are, in effect, a convex lens surface receiving a diverging beam and concentrating it to a parallel beam, as indicated at H, H', K, K', and L, L'.

Section 22 of lens cover 5 is reversely arched to be below the meeting plane. It will not transmit any direct light from the lamp so as to cause glare outside of the window and can be easily arranged so that it will not transmit reflected light outside of the window. If the luminair is to be used recessed in windows with closed backs, it is desirable that some light shall be delivered at high angles, in fact, substantially up to the edge of the ceiling. In order to accomplish this, the section 22 has been bowed out below the flange of the lens. By means of the refracting surfaces 14 on the inside of the reflector form, the reflected light is brought down to the section 22 in substantially vertical directions, as indicated by the rays B' and C'. The inside surface of section 22 is provided with transverse parallel prisms 23 adapted to receive direct light from the lamp and throw it back into the window at angles near the horizontal, as indicated by the rays M, M', and at the same time receive the reflected light B', C' and bend it slightly inward, as indicated at B'' and C''.

If the prism design 23 were used throughout section 22, some of the direct light would be emitted at wide lateral angles, which would be wasteful. To more effectively control the light, the outer surface of the lens has been provided with two sets of concentric prisms 24, as shown in Figures 6 and 7. The interior surface opposite these prisms is left smooth. These prisms are so formed that their interior surfaces, such as 25, intercept very little of the direct light, while their outer surfaces, such as 26, refract direct light downwardly, as shown by the rays N, N'. On the other hand, the outer surfaces, such as 26, intercept very little of the reflected light, while the inward surfaces, such as 25, refract the reflected light downwardly, as shown by the rays O, O'.

In order to join the lens sections 16 and 19 with lens section 22, a smooth connecting surface 27 is used. This is preferably a plane surface set at an angle so that it will intercept the least possible direct light from the source.

Figure 5:
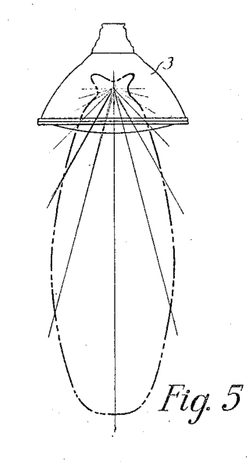
Figure 5 shows the distribution of light intensity in lateral directions corresponding with the plane 5—5 of Figure 2.

Figure 2 shows the distribution of emitted light intensity in the plane of Figure 1. Figure 5 shows the distribution of light intensity in the lateral plane 5—5 of Figure 2. From Figure 2 it will be seen that practically all the light is directed downwardly at angles lower than 15° front and 30° rear. Very little light is emitted at high enough angles to cause glare in the front of the window, and a substantial amount is emitted at high rear angles to illuminate the upper rear part of the show window. The narrowness of the beam in lateral directions at the angle of greatest intensity is indicated in Figure 5, from which it will appear that the unit is especially well adapted for windows of narrow frontage.

Figure 9:
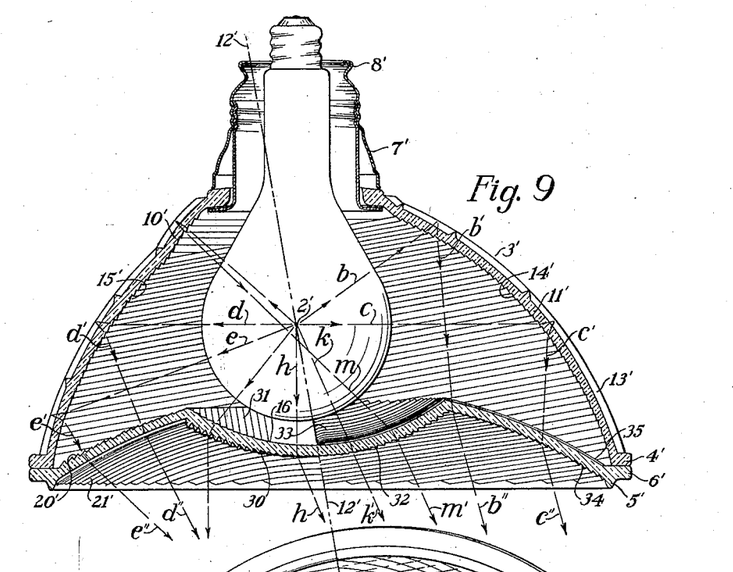
Figures 9 and 10 are sectional and inverted plan views of a luminair similar to that of Figures 1–8 inclusive, but designed for use in open back windows and avoiding light at high angles toward the rear.
Figure 10:
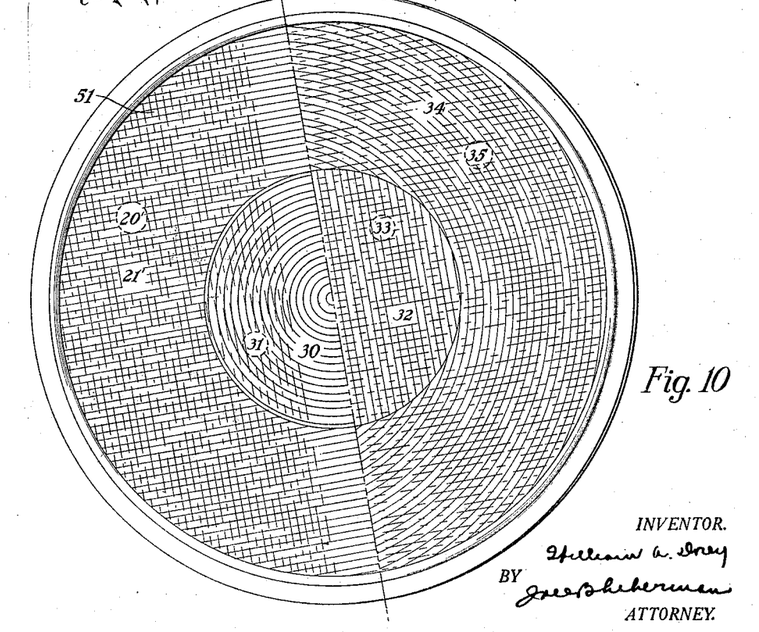

The luminair shown in Figures 9 and 10 is generally similar to the one shown and described above. It is more especially designed for installation in show windows with open backs and to avoid rearwardly directed light at high angles. It is arranged to be mounted flush in a horizontal ceiling in the same manner as the structure previously described. Corresponding parts are designated by the same reference number with a prime added, and correspondingly directed light rays are designated by the corresponding lower case reference letter.

The inner prisms 15' on the left or front side of the reflector form 3' are made to shift the reflected light inward as much as possible. Those shown at 14' on the rear side of the reflector are shallow and will operate to get the light onto the outer ring of the cover lens with as little scattering as possible. The outer ring of the lens 5' is arched above the meeting plane of the two glass parts and is made in the form of a concave spherical surface of such radius that direct light striking it will be reduced to a minimum and, on account of the high angles of incidence, this direct light will be broken up and scattered.

The prisms 30 on the lower side of the lens 5' are moderately concentrating and are backed by parallel prisms 31 to increase the concentration in a lateral plane at and near 10° inward, 10° being the angle of inclination of the axis. The prisms 32 are parallel and designed to shift light upward and inward. They are backed by parallel prisms 33 to concentrate light toward the normal plane, or plane of symmetry. The upper part 10' of the reflector form is spherical to cooperate with the central lens part and permit angular offset of the metal holder or extension 7.

The arcuate portion of the lens plate 5' to the rear of the unit receives the convergent light from the reflector above it. This portion of the lens plate is provided with concentric prisms 34 designed to make these convergent rays slightly divergent, so that they will be thrown into the window at somewhat greater angles than 10°. The parallel prisms 35 will cooperate with the prisms 34 to condense the light toward the plane of the section. On the opposite or front side of the lens the arched portion is similar to that shown in Figures 1 and 2, and is provided with prisms 20' and 21' for the same purpose.

Inasmuch as the lens cover in the form of construction in Figures 9 and 10 is all above the meeting plane, the unit will be characterized by the absence of light at high angles and will be more suitable for open back windows or island windows.

Figure 11:
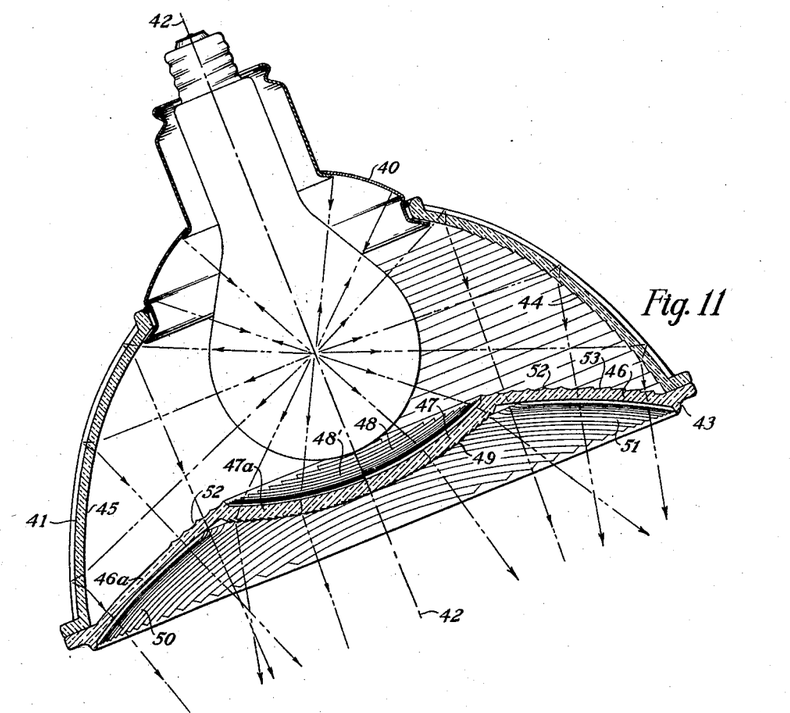
Figure 11 is a sectional view, similar to Figure 1, showing a luminair designed for flush mounting in a sloping ceiling.

The luminair shown in Figure 11 is more particularly designed for mounting in an inclined ceiling. In this luminair the reflector form is made in two parts, the part 40 being a metal reflector, and the lower part 41 being a glass reflector. The metal reflector 40 is spherical and, as shown, is arranged for a lamp carried on an inclined axis 42—42, preferably the axis of the reflector form. The glass portion 41 of the reflector is provided with horizontal prisms 44, similar to the prisms 14, to increase the concentration of the reflected light onto an arcuate portion of the cover lens. The front side of the prismatic reflector may be smooth, as indicated at 45.

Figure 11A:
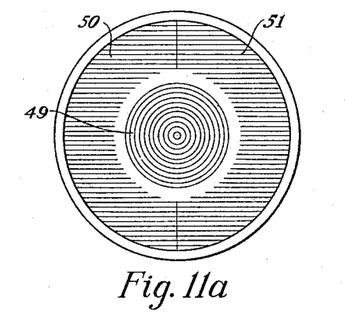
Figures 11a and 11b are diagrammatic views of the outside and inside of the cover plate shown in Figure 11.
Figure 11B:
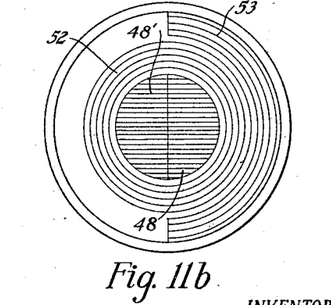

The cover lens 43 has an annular arched portion indicated at 46 and 46a, and a circular inner portion indicated at 47 and 47a. The portion 47 of the central part of the lens is provided with deep parallel lens strips 48 of positive sign to concentrate transverse light, while the other side 47a has similar but shallower lenses 48'. The lower side of this central section 47 has light concentrating prisms indicated at 49. The arched portions 46 and 46a of the cover lens are provided with deep parallel lens strips 50 and 51 of negative sign to concentrate transverse light, the lens strips 51 being the shallower. The upper surface of the arched portions 46 and 46a of the lens cover is provided with shallow concentric flutes 52 to assist in scattering direct light received by the arched portion of the cover. Outside these flutes the portion 46 of the lens cover is provided with concentric lens prisms 53 to increase the concentration of reflected light.

The paths of the direct and reflected rays are indicated by the dot and dash lines in the drawing.

I claim:

1. A luminair comprising a light source, a reflector form set at an angle with the vertical, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light.

2. A luminair comprising a light source, a reflector form set at an angle with the vertical, and a lower prismatic cover, both meeting each other in a plane below the light source, the reflector form being formed to direct light rays from the source toward the cover and converge the light into an arcuate band, the cover having a prismatic peripheral arcuate portion arched above the meeting plane and adapted to receive and transmit said arcuate band of convergent light.

3. A luminair comprising a light source, a reflector form set at an angle with the vertical, and a lower prismatic cover, both meeting each other in a plane below the light source, the reflector form being formed to direct light rays from the source toward the cover and converge the light into an arcuate band, the cover having a prismatic peripheral arcuate portion arched above the meeting plane and adapted to receive and transmit said arcuate band of convergent light, and to screen off direct light at high angles and scatter the same.

4. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light in the general direction of the slanting axis and to condense it into the vertical plane passing through the slanting axis.

5. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light in the general direction of the slanting axis and to condense it into the vertical plane passing through the slanting axis, the portion of the plate within the arcuate band being provided with opposed prisms adapted to act on direct light to condense it toward said vertical plane and transmit it generally in the direction of the slanting axis.

6. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a prismatic peripheral arcuate portion arched above the meeting plane and adapted to receive and transmit said arcuate band of convergent light in the general direction of the slanting axis and to condense it into the vertical plane passing through the slanting axis, said portion being also adapted to screen off direct light at high angles and scatter the same.

7. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light in the general direction of the slanting axis and to condense it into the vertical plane passing through the slanting axis, said portion being also adapted to screen off direct light at high angles and scatter the same, the portion of the plate within the arcuate band being provided with opposed prisms adapted to act on direct light to condense it toward said vertical plane and transmit it generally in the direction of the slanting axis.

8. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light, the reflector being also formed to redirect other reflected rays into a sector of substantially vertical light, the cover having a prismatic sector for receiving said substantially vertical light and transmitting it generally in the direction of the slanting axis.

9. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a peripheral arcuate portion adapted to receive and transmit said arcuate band of convergent light, the reflector being also formed to redirect other reflected rays into a sector of substantially vertical light, the cover having a prismatic sector for receiving said substantially vertical light and transmitting it generally in the direction of the slanting axis, the portion of the plate within the arcuate band and sector being provided with opposed prisms adapted to act on direct light to condense it toward said vertical plane and transmit it generally in the direction of the slanting axis.

10. A luminair comprising a light source, a reflector form set at an angle with the vertical and having a slanting axis intersecting the light source, and a lower prismatic cover, both meeting each other in a plane below the light source, the reflector form being formed to direct light rays from the source toward the cover and converge the light into an arcuate band, the cover having a prismatic peripheral arcuate portion arched above the meeting plane and adapted to receive and transmit said arcuate band of convergent light, the reflector being also formed to redirect other reflected rays into a sector of substantially vertical light, the cover having a prismatic sector reversely arched to be below the meeting plane for receiving said substantially vertical light and transmitting it generally in the direction of the slanting axis.

11. A luminair comprising a light source, a reflector form set at an angle with the vertical and having a slanting axis intersecting the vertical, and a lower prismatic cover, both meeting each other in a horizontal plane below the light source, whereby the reflector form has a longer side and a shorter side, the shorter side of the reflector form being formed to direct light rays from the source toward the cover and converge the light into an arcuate band, the cover having a prismatic peripheral arcuate portion arched above the meeting plane and adapted to receive and transmit said arcuate band of convergent light, and to screen off direct light at high angles and scatter the same.

12. A luminair comprising a light source, a reflector form set at an angle with the vertical and having a slanting axis intersecting the vertical, and a lower prismatic cover, both meeting each other in a horizontal plane below the light source, whereby the reflector form has a longer side and a shorter side, the shorter side of the reflector form being formed to direct light rays from the source toward the cover and converge the light into an arcuate band, the cover having a prismatic peripheral arcuate portion arched above the meeting plane and adapted to receive and transmit said arcuate band of convergent light, and to screen off direct light at high angles and scatter the same, the longer side of the reflector form being formed to direct light rays from the source toward the cover with the reflected rays in a sector of substantially vertical light, the cover having a prismatic sector reversely arched to be below the meeting plane for receiving said substantially vertical light and transmitting it generally in the direction of the slanting axis.

13. A luminair comprising a light source, a reflector form set at an angle with the vertical and having a slanting axis intersecting the vertical, and a lower prismatic cover, both meeting each other in a horizontal plane below the light source, whereby the reflector form has a longer side and a shorter side, the shorter side of the reflector form being formed to direct light rays from the source toward the cover and converge the light into an arcuate band, the cover having a prismatic peripheral arcuate portion arched above the meeting plane and adapted to receive and transmit said arcuate band of convergent light in the general direction of the slanting axis and to condense it into the vertical plane passing through the slanting axis, the longer side of the reflector form being formed to direct light rays from the source toward the cover with the reflected rays in a sector of substantially vertical light, the cover having a prismatic sector reversely arched to be below the meeting plane for receiving said substantially vertical light and transmitting it generally in the direction of the slanting axis, the portion of the plate within the arcuate band and sector being provided with opposed prisms adapted to act on direct light to condense it toward said vertical plane and transmit it generally in the direction of the slanting axis.

14. A luminair comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form, the shorter side of the reflector form being provided with internally disposed refracting ribs normal to the slanting axis for converging the reflected rays into an arcuate band, the cover having a peripheral arcuate prismatic portion arched above the meeting plane and disposed under the shorter side of the reflector for screening off direct light at high angles and for receiving the arcuate band of convergent light and transmitting it generally in the direction of the slanting axis.

15. A luminair comprising a light source, a reflector form set at an angle with the vertical and having a slanting axis intersecting the light source, and a lower prismatic cover, both meeting each other in a plane below the plane of the light source, the reflector and cover each being symmetrical about a vertical plane passing through the slanting axis of the reflector form, the reflector form being provided with internally disposed refracting ribs normal to the slanting axis for converging the reflected rays into an arcuate band, the cover having a peripheral arcuate prismatic portion arched above the meeting plane and disposed under the shorter side of the reflector for screening off direct light at high angles and for receiving the arcuate band of convergent light and transmitting it generally in the direction of the slanting axis.

16. A luminair, comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form, the shorter side of the reflector form being provided with internally disposed refracting ribs normal to the slanting axis for converging the reflected rays into an arcuate band, the cover having a peripheral arcuate prismatic portion arched above the meeting plane and disposed under the shorter side of the reflector for screening off direct light at high angles and for receiving the arcuate band of convergent light and transmitting it generally in the direction of the slanting axis, the longer side of the reflector form having internally disposed refracting ribs normal to the reflector axis for redirecting the reflected rays into a sector of substantially vertical light, the cover having a prismatic sector reversely arched to be below the meeting plane for receiving said substantially vertical light and transmitting it in the general direction of the slanting axis.

17. A luminair, comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form, the shorter side of the reflector form being provided with internally disposed refracting ribs normal to the slanting axis for converging the reflected rays into an arcuate band, the cover having a peripheral arcuate prismatic portion arched above the meeting plane and disposed under the shorter side of the reflector for screening off direct light at high angles and for receiving the arcuate band of convergent light, transmitting it generally in the direction of the slanting axis and condensing it toward said vertical plane, the longer side of the reflector form having internally disposed refracting ribs normal to the reflector axis for redirecting the reflected rays into a sector of substantially vertical light, the cover having a prismatic sector reversely arched to be below the meeting plane for receiving said substantially vertical light and transmitting it in the general direction of the slanting axis, the reversely arched portion also receiving direct light and light reflected by a spherical portion of the reflector and transmitting it at high angles.

18. A luminair, comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form the shorter side of the reflector form being provided with internally disposed refracting ribs normal to the slanting axis for converging the reflected rays into an arcuate band, the cover having a peripheral arcuate prismatic portion arched above the meeting plane and disposed under the shorter side of the reflector for screening off direct light at high angles and for receiving the arcuate band of convergent light, transmitting it generally in the direction of the slanting axis and condensing it toward said vertical plane, the longer side of the reflector form having internally disposed refracting ribs normal to the reflector axis for redirecting the reflected rays into a sector of substantially vertical light, the cover having a prismatic sector reversely arched to be below the meeting plane for receiving said substantially vertical light and transmitting it in the general direction of the slanting axis, the reversely arched portion also receiving direct light and light reflected by a spherical portion of the reflector and transmitting it at high angles, the portion of the plate within the arcuate band and sector being provided with opposed prisms adapted to act on direct light to condense it toward said vertical plane and transmit it generally in the direction of the slanting axis.

19. A luminair, comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form, the cover having a prismatic sector reversely arched to be below the meeting plane for receiving said substantially vertical light and transmitting it in the general direction of the slanting axis, the reversely arched portion also receiving direct light and light reflected by a spherical portion of the reflector and transmitting it at high angles.

20. A luminair, comprising a light source, a reflector form set at an angle with the vertical and having a slanting axis intersecting the light source, and a lower prismatic cover, both meeting each other in a horizontal plane below the plane of the light source whereby the reflector has a longer side and a shorter side, the reflector and cover each being symmetrical about a vertical plane passing through the slanting axis of the reflector form, the cover having a prismatic sector reversely arched to be below the meeting plane for receiving said substantially vertical light and transmitting it in the general direction of the slanting axis, the reversely arched portion also receiving direct light and light reflected by a spherical portion of the reflector and transmitting it at high angles, the sides of the sector having prisms to redirect the light at the lateral edges thereof toward the axis of the luminair.

21. A luminair comprising a light source, a reflector form set at an angle with the vertical, and a lower prismatic cover, both meeting each other in a plane below the plane of the light source, the reflector being formed to direct light rays from the source cover to converge the rays into an arcuate band, the cover having a peripheral arcuate portion arched above the meeting plane for receiving and transmitting said arcuate band of convergent light and for screening off direct light at high angles, said arcuate portion having refracting ribs for straightening out the convergent light and redirecting it into transverse planes parallel with the inclined axis.

22. A luminair comprising a light source, a reflector form set at an angle with the vertical, and a lower prismatic cover, both meeting each other in a horizontal plane below the plane of the light source, the reflector being formed to direct light rays from the source toward the cover and to converge the rays into an arcuate band, the cover having a semi-circular peripheral arcuate portion at one side arched above the meeting plane for receiving and transmitting said arcuate band of convergent light and for screening off direct light at high angles, the other side of the cover having a reversely arched portion for receiving direct light from the light source and emitting it at high angles nearly horizontal.

23. A luminair comprising a light source, a reflector form set at an angle with the vertical, and a lower prismatic cover, both meeting each other in a horizontal plane below the plane of the light source, whereby the luminair may be recessed in a horizontal ceiling with the meeting plane of the parts substantially in the plane of the ceiling, the cover being adapted to deliver the major portion of the light rays in a beam which is narrow in directions transverse to the inclinations of the reflector form, most concentrated along the axis of the reflector form but extended up to the horizontal in the general direction of the inclinations of the axis and restricted at high angles in the opposite side of the axis.

24. In a luminair, a light source, a reflector form set at an angle with the vertical and having a horizontal opening and a slanting axis intersecting the vertical axis at the light source whereby the reflector has a shorter side and a longer side, the shorter side of the reflector having internal refracting ribs disposed in planes normal to the axis of the reflector form and adapted to redirect light rays into a semi-circular convergent band all the rays of which partake of the obliquity of the reflector axis.

25. In a luminair, a light source, a reflector form set at an angle with the vertical and having a horizontal opening and a slanting axis intersecting the vertical axis at the light source whereby the reflector has a shorter side and a longer side, said reflector having two series of internal refracting ribs disposed in planes normal to the axis of the reflector form and adapted to redirect light rays toward the opening, the series of ribs on the shorter side of the reflector being adapted to converge the redirected rays into a semi-circular band, all these rays partaking of the obliquity of the reflector axis, the series of ribs on the longer side similarly converging the light at angles more nearly vertical.

26. In a luminair, a light source, a reflector form set at an angle with the vertical and having a horizontal opening and a slanting axis intersecting the vertical axis at the light source whereby the reflector has a shorter side and a longer side, said reflector having internal refracting ribs disposed in planes normal to the slanting axis and adapted to redirect light rays from the source toward the opening in the reflector and to converge said rays into an arcuate band substantially all of the rays of which are characterized by partaking of the obliquity of the reflector axis, a prismatic cover fitting the reflector opening, the cover being adapted to deliver a major portion of the light rays in a beam which is narrow in directions transverse to the inclination of the reflector form, most concentrated along the axis of the reflector form but extended up to the horizontal in the general direction of the inclination of the axis and restricted at high angles on the opposite side of the axis.

27. In a luminair, a glass plate having a circular mounting flange in one plane and symmetrical about a plane at right angles to the flange, a peripheral arcuate portion arched above the plane of the flange and provided with opposed prisms for condensing convergent light toward the plane of symmetry and casting it in an oblique direction in said plane, a reversely arched sector provided with prisms transverse of said plane of symmetry, and a central area provided with opposed prisms for condensing divergent light toward said plane and directing it in an oblique direction.

Signed at Newark, in the county of Licking and State of Ohio, this 2nd day of December, 1929.

WILLIAM A. DOREY.